(12) United States Patent
Corominas (10) Patent No.: US 6,901,850 B2
(45) Date of Patent: Jun. 7, 2005

(54) HEAD HAVING MULTIPLE RETRACTABLE NEEDLES NEEDED FOR THE INJECTION OF PIECES OF MEAT AND THE INJECTING NEEDLE FOR SAME

(75) Inventor: Narcis Lagares Corominas, Girona (ES)

(73) Assignee: Metalquimia, S.A. (ES)

( * ) Notice: Subject to any disclaimer, the term of this patent is extended or adjusted under 35 U.S.C. 154(b) by 0 days.

(21) Appl. No.: 10/478,230
(22) PCT Filed: May 18, 2001
(86) PCT No.: PCT/ES01/00196

§ 371 (c)(1),
(2), (4) Date: Jul. 19, 2004

(87) PCT Pub. No.: WO02/094028

PCT Pub. Date: Nov. 28, 2002

(65) Prior Publication Data

US 2004/0237804 A1 Dec. 2, 2004

(51) Int. Cl.⁷ .................................................. A23L 1/31
(52) U.S. Cl. .............................. 99/533; 99/487; 99/532
(58) Field of Search .......................... 99/485–487, 494, 99/516, 532–536; 426/231, 281, 332, 442, 541, 641, 650, 652

(56) References Cited

U.S. PATENT DOCUMENTS 4,254,151 A  *  3/1981  Townsend ................... 426/231
4,437,397 A  *  3/1984  Kawai .......................... 99/533
4,690,046 A  *  9/1987  Corominas ................... 99/533
5,664,488 A  *  9/1997  Smith ........................... 99/487
5,773,060 A  *  6/1998  Smith .......................... 426/281

* cited by examiner

Primary Examiner—Timothy F. Simone
(74) Attorney, Agent, or Firm—Black Lowe & Graham, PLLC (57) ABSTRACT

The invention relates to a head having multiple retractable needles for injecting pieces of meat and the injecting needle for same, said head comprising a liquid supply chamber. Injecting needles (4) extend through the supply chamber. Said needles are provided with a penetration point (14), a passage (12), which communicates with the injection openings (15) located close to the point (14), and distal end (18), far from the point (14), which is provided with a limiting piece (17). The distal end (18) is disposed opposite elastic retaining means that can be used to draw the needle back if said needle comes into contact with a bone in the piece of meat to be injected. The supply chamber comprises numerous parallel, interconnected and elongated conduits (3) through which certain sections (4a) of the needles (4) can be guided to slide. Said conduits (3) are provided with a diameter greater than that of said sections (4a) and means (5) for sealing and guiding/centring said sections (4a) at the inlet and outlet of each conduit (3). The needles (4) comprise opposing openings (13) which communicate with said passage (12), said openings (13) being disposed in an area of said section (4a) at a distance from the limiting piece (17) that is approximately equal to the length of the conduit (3).

21 Claims, 5 Drawing Sheets

HEAD HAVING MULTIPLE RETRACTABLE NEEDLES NEEDED FOR THE INJECTION OF PIECES OF MEAT AND THE INJECTING NEEDLE FOR SAME

FIELD OF THE INVENTION

This invention refers to a head having multiple retractable needles applicable for injecting in meat product with or without bone or other food masses fluid substances such as brine, proteins, phosphates or similar products in a solution, in order to enrich such meat product or to improve its preservation conditions.

The invention also refers to an injection needle having special characteristics devised for being installed in the said head.

BACKGROUND OF THE INVENTION

The head proposed is of the kind which comprises a set of hollow spaced needles mounted on the said head and arranged through a distribution chamber connected to a supply for supplying the fluid substance to be injected under a pressure over 5 Kg/cm$^2$ and which can move back getting over the strength of an elastic means in the event of finding a resistance within the meat product such as a bone and such head being operatively associated to:

means for moving forwards such meat product under it with intermittent stops along a path;

lowering-lifting means for moving such head, in an upright run, such needles penetrating in the meat products, in such stop steps and then going out of the meat product;

means for supplying such pressurized fluid substance within the needles, and means for collecting the excess of fluid after injecting the meat product.

A head according to above characteristics is disclosed in the application for a patent WO83/02547 (BELAM) where elastic retaining means for the needles are disclosed, formed by pistons loaded with a fluid which allow the back motion of the needles and at same time that they stop injecting after a short back motion.

It is also usual in this kind of heads to use a set of retractable rammers which act pressing the meat product and linked to elastic means having holes for such needles passing through them.

Unlike the apparatus disclosed in such application for a patent WO83/02547, in which the fluid substance is send at low pressure (pressures around 4 Kg/cm$^2$) as the needles are inserted in the meat product, the head according to the invention is of the type designed to an injection under constant high pressure (of around 6 to 12 Kg/cm$^2$) which uses needles having a series of holes, in general 11 to 14, distributed at different distances with respect to the penetration point along the body of the needle, and in an area close to the said point, such holes having a diameter of about 0.6 mm, the fluid substance being injected by spraying under pressure when the needles are stopped in position, stuck in the meat product. Thus, when the needles already crossed the meat product and are stopped at the end of their run (limit position at the lower run of the head) the fluid substance is injected within the meat with a "spray effect" introducing in the meat product a volumetrically dosed amount of the said substance, which is distributed in a very homogenous way throughout the meat product.

The patent of invention ES-A 2 087 028 of same applicant discloses a needle for injection of brine by spraying it in meat product of the kind involved.

On the other hand, the patent ES-A468071 also of the applicant discloses improvements to the machines for injecting brine to meat products which allow to supply the brine according to an adjustable injection under a constant pressure.

In the patent ES-A-532269, the applicant also discloses a structure of the rammers of an injection machine for needles having multiple holes as the above mentioned which prevent that foam is formed when the fluid substance is going out through the holes of the needle not inserted in the meat product (for example, because the needle comes backs because it found a bone).

The head disclosed comprises a structure with a distribution chamber according to the principle disclosed in the said patent WO83/02547, but made in such a way that it is possible to carry out an injection under a constant high pressure, which starts when the needles are fully stuck in the meat product and the head is at the lower part of its lowering run and using very long needles which can move back on a long distance (about 250–300 mm) and make possible that the injection is effective, whichever the level of insertion thereof be in the meat product.

SHORT EXPLANATION OF THE INVENTION

According to the invention, the said distribution chamber, built in the head itself, comprises a plurality of elongated, parallel, intercommunicated ducts through which needles are arranged, loosely enough as such ducts have a diameter slightly wider than them, and sealing and guiding-centring means for such needles having been provided close to the inlet and outlet of each duct.

On its hand, the injection needles used comprises an axial passageway, a pair of diametrally opposed holes at a point far way the penetration point, the said holes are always kept within the duct for the access of the said fluid to be injected within the said passageway and an area immediately close to the penetration point provided with several holes spaced along the needle, having a small section.

For such purpose, the said holes for the access of the fluid to the internal passageway of the needles are far away the top end, distal from the penetration point of the needle, where this later integrates an insertion limiting stop, a slightly longer distance than the length of each duct and remain positioned, in a lifting position of the head, prior to the injection close to the lower end of each duct, so that because of such gap, such holes always remain within the related through duct, whichever be the level of the needle back motion.

According to a preferred embodiment, such distribution chamber is constituted based on a prismatic block provided with a plurality of upright, cylindric, through ducts, arranged equidistant and distributed according to several parallel rows, the diameter of each duct being slightly wider than that of the needles, defining around them an annular cavity for the fluid, such needles extending through the said ducts and sockets established within sleeves threaded on the inlet and outlet mouths of each duct, constituting such guided-centred means the ducts of each row being communicated to each other through a cross duct linking at its ends with the distribution ducts leaning against each side of the block communicated with such tank for supplying fluid to be injected.

For an effective behaviour of the head, according to the principles explained, the length of each duct is slightly longer than the maximum admissible back motion an injection needle can sustain, in the event it finds a bone in the meat piece to be injected.

For best understanding the characteristics of the invention, a description thereof will appear below according to illustrating drawings of a possible example of embodiment, which has to be purported as illustrating and not limiting, according to following detail:

SHORT EXPLANATION OF THE DRAWINGS

Last.

DETAILED DESCRIPTION OF THE EXAMPLE OF A PREFERRED EMBODIMENT

The head of multiple, retractable needles for injecting meat products according to this invention, is designed to form part of a machine for injecting meat product pieces of a conventional type, and therefore, not illustrated, in which the said head is connected to driving means which confer it a to and fro motion according to an upright lowering-lifting run with respect to an horizontal moving surface on which are arranged the meat product pieces to be injected. The said moving surface is driven by suitable means to make the meat product pieces move forwards step by step in coordination with the upright displacements of the head, so that the moving surface only goes forwards when the head is in a lifted position and the head is lowered only when the moving surface is stopped. The head is associated to a tank of the said fluid substance to be injected and to means for supplying such fluid substance under pressure from the said tank.

Figure 1:
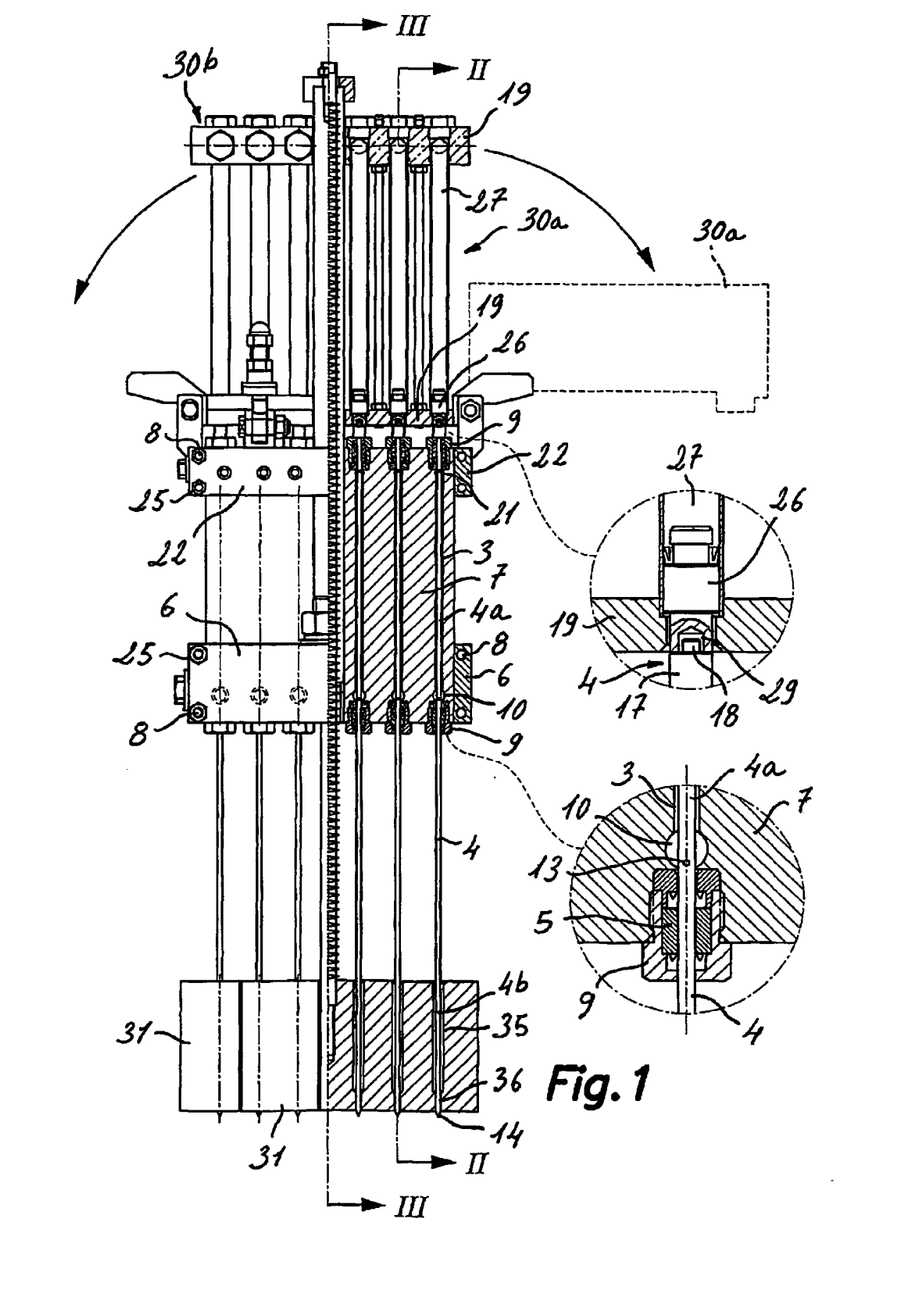
FIG. 1 is a side elevation view, with a sectioned half, of the head according to this invention, including enlarged details of a piston of the elastic means and a sealing and guiding means for the needles.
Figure 2:
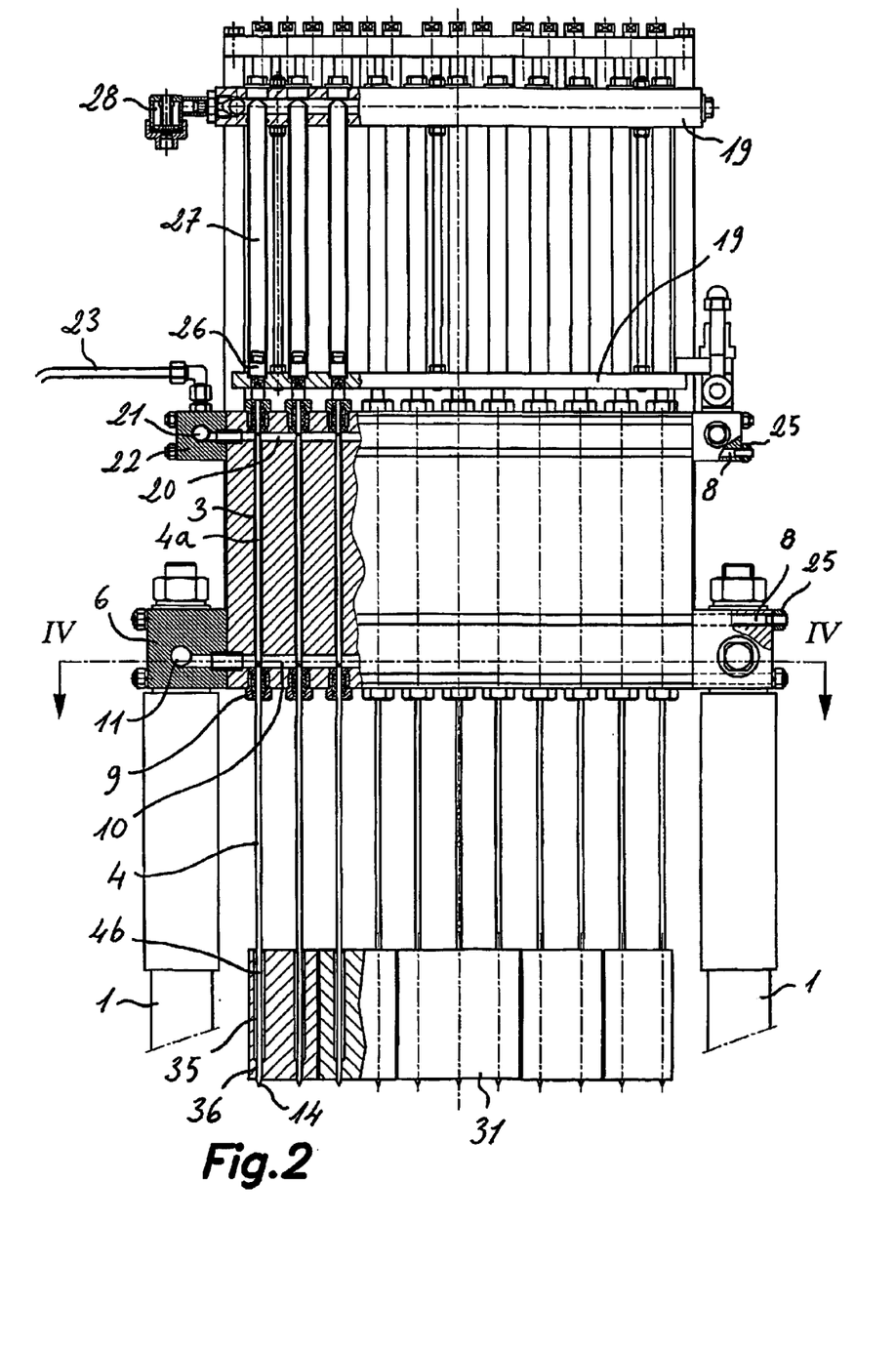
FIG. 2 is a front elevation view with a part sectioned by the plane II—II of FIG. 1.
Figure 3:
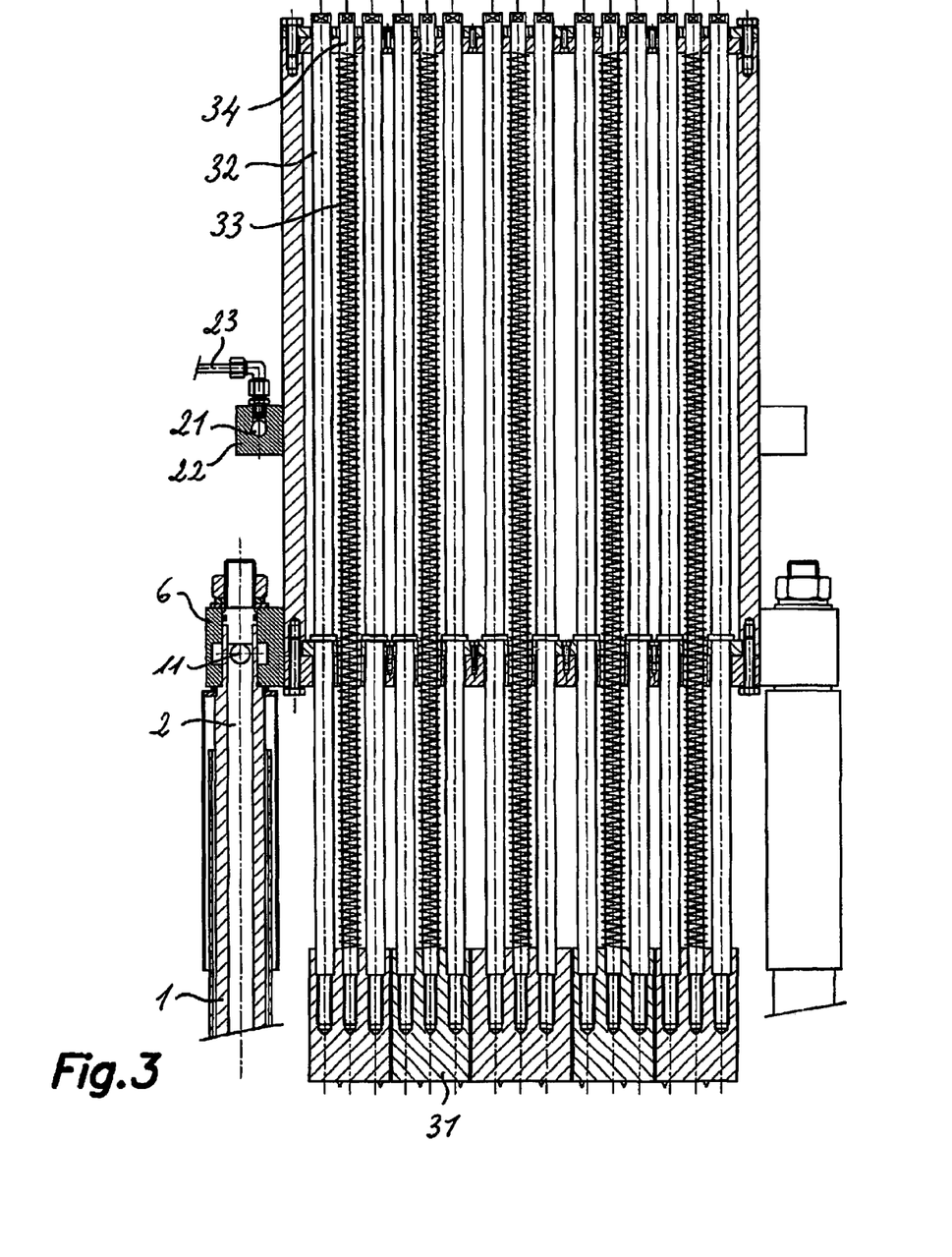
FIG. 3 is a cross sectional view taken by the plane III—III of FIG. 1.
Figure 4:
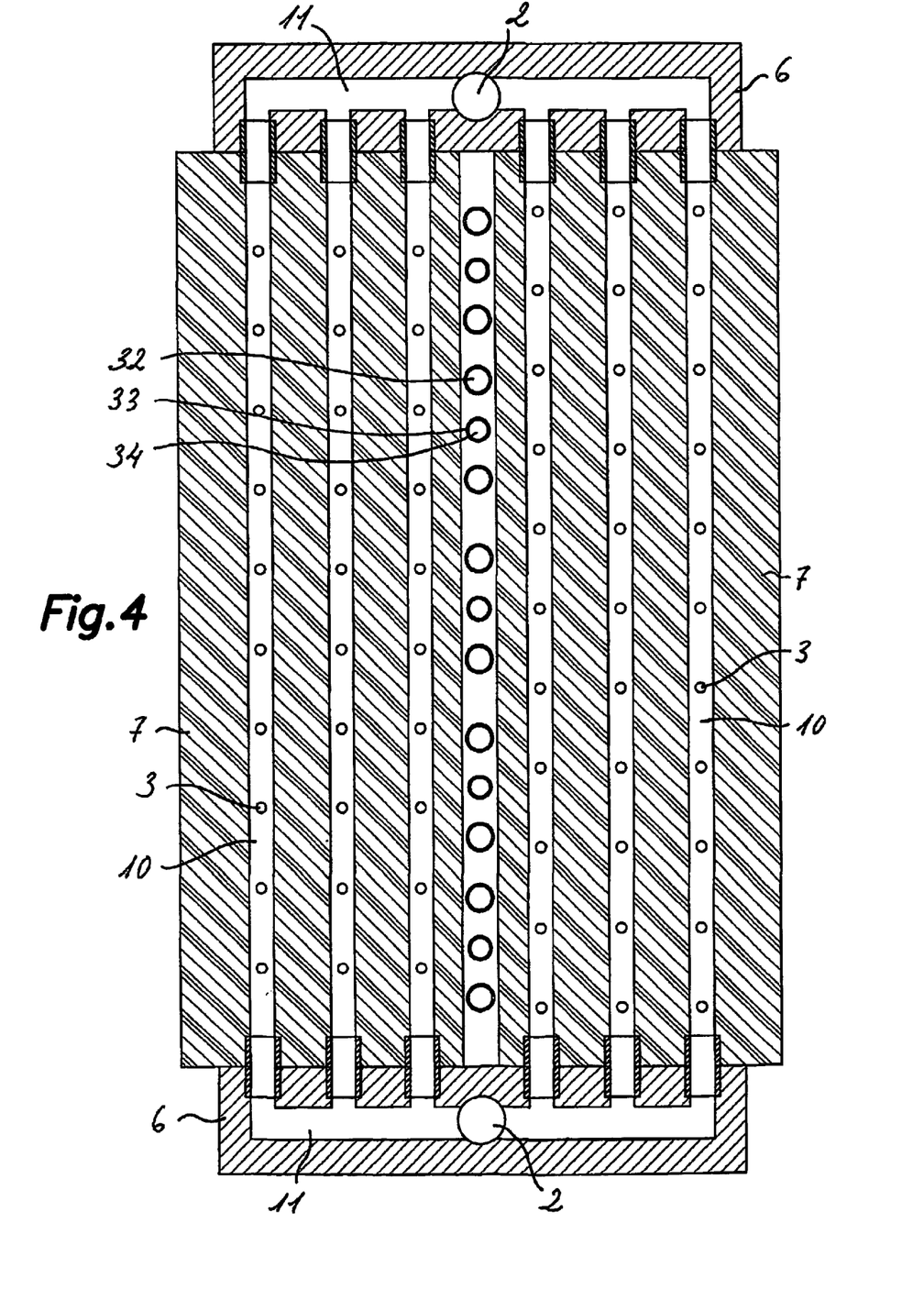
FIG. 4 is a cross sectional view taken by the plane IV—IV of FIG. 2.

The motion conferred by the said driving means are transmitted to the head by means of hollow columns 1 (FIG. 3), suitably guided, through the internal duct 2 of which the fluid to be injected to the head is supplied as it is shown in FIG. 3. The top ends of the said columns 1 are fixed to supporting elements 6 between which a prismatic block 7 is fastened. The said prismatic block 7 defines inside a chamber distributing the fluid to be injected, which is constituted by a plurality of upright cylindric, through ducts 3 arranged equidistant and distributed according to several rows parallel to each other, as it is best seen in FIG. 4, within each of the said upright ducts 3 an injection needle 4 is mounted so that it can slide along it. The internal diameter of the said ducts 3 is slightly wider than the outside diameter of the needles 4 so that between the needles 4 and the internal wall of the ducts 3, remains a clearance forming an annular cavity which is filled with the fluid to be injected. As it can be best seen in the enlarged detail of FIG. 1, in each internal duct 3, the corresponding needle 4 is centred and its displacement guided by sockets 5 established within sleeves 9 threaded at the inlet and outlet mouth of each duct 3.

The ducts 3 of each row are communicated to each other by a cross duct 10 and each of such cross ducts 10 is linked by its ends with distributing ducts 11 integrated in the said supporting elements 6 leaning against each side of the block 7, such distributing ducts 11 being communicated with the said internal ducts 2 of the hollow columns 1, such ducts 2 being in turn connected to the supply tank of fluid to be injected. The cross ducts 10 of intercommunication between each row of upright ducts 3, as well as the distributing ducts 11 of the supporting elements 6 are located close to the lower face of the two blocks 7, thereafter referred as block 7, which is closest to the injection area.

The rows of ducts 3 are communicated, in addition with cross ducts 20 located close to its top end, farthest from the injection area, which communicate in turn by its ends with collecting ducts 21 integrated in supporting elements 22 laterally associated to the block 7 and which link with a draining manifold 23.

As well the supporting elements 6 as the supporting elements 22 are fastened to the block 7 by stays 8 extending between the two side faces of the block 7, packing it and fastening it with locking nuts 25 associated to its ends.

Figure 6:
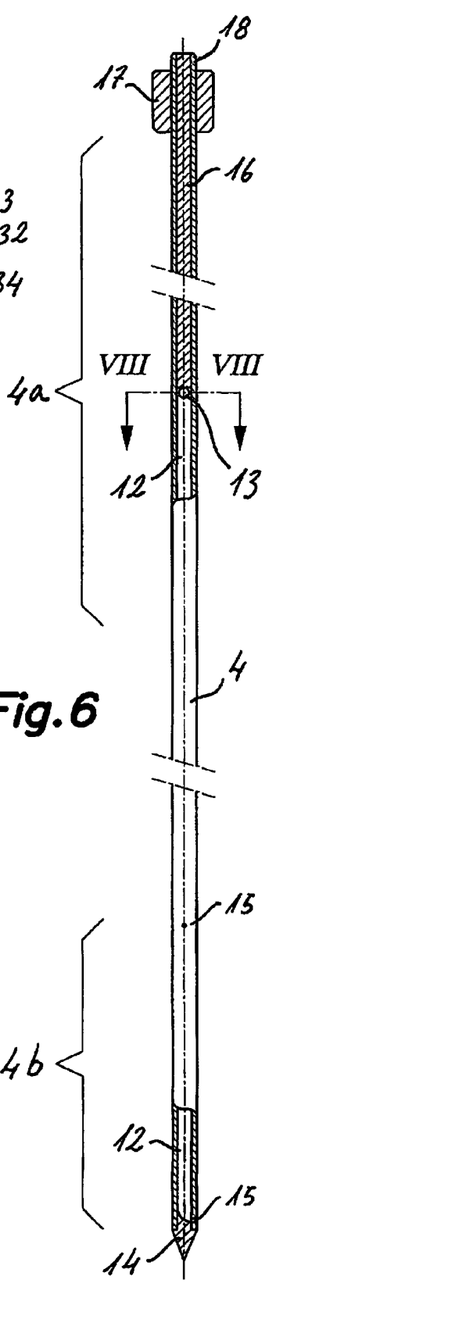
FIG. 6 is a partly sectional side view of an injection needle according to this invention.
Figure 7:
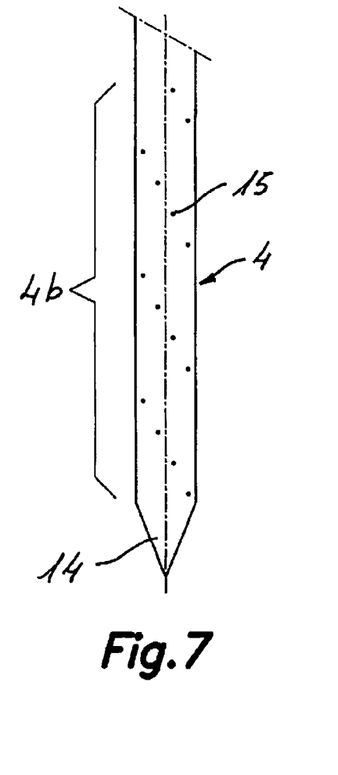
FIG. 7 is an enlarged detail of the distribution of the holes in the area of the point of the needle of FIG. 6.

As it is shown in FIG. 6, each of the needles 4 comprises an elongated hollow, tube-shaped body ending in a penetration point 14, an axial passageway 12, at least a hole 13 (for the fluid entering) far away the said penetration point 14 and an area immediately close to the penetration point 14 provided with several injection holes 15, having a small section, distributed spaced along the said area. Although in the said FIG. 6 only the two holes 15 of the ends of the said are close to the penetration point 14 are illustrated, the full arrangement of them is shown in FIG. 7. The end of the distal needle of the penetration point 14 are closed by means of a rod 16 clogged in the said axial passageway 12. At the external part of such end, there is a stop 17 limiting the insertion (of the needles 4 in the ducts 3) from which is protruding a end 18.

FIG. 7 shows an enlarged detail of the preferred distribution of the said injection holes 15 in the area adjacent to the penetration point 14 forming an helical pattern.

Figure 8:
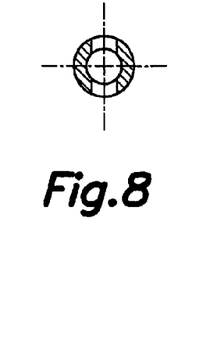
FIG. 8 is an enlarged cross sectional view taken by the plane VIII—VIII of FIG. 6, through the holes for fluid entering to the internal passageway of the needle.

On the other hand, as it is shown in FIG. 8, in the said position far away the penetration point 14 are preferably arranged two holes 13, facing each other with the particularity that its passing section protrudes the passing section of the passageway 12 within the needle 4. Such holes 13 remain located within the duct 3, which, as above mentioned, is filled with fluid to be injected which have access to inside the said axial passageway 12 of the needles through the said holes 13, The distance from the holes 13 up to the top ends of the needles 4 and concretely up to the stop 17 limiting the insertion is slightly longer than the length of each duct 3 and the said holes 13 remain positioned, in lifted position of the head, prior to the injection, close to the lower end of each duct 3. With this, the holes 13, given their gap from the said stop 17, shall always be within their corresponding through ducts 3, and therefore communicated with the chamber distributing fluid, when the needles 4 make their retraction travel (and the part 4a of each needle 4 is moved, guided at the two ends of the duct 3) whichever the back motion of such needle 4 be.

Each needle 4 is facing, by its top end 18, bearing the stop 17, distal from the penetration point 14, against elastics retaining means to allow the back motion of the needle 4 with respect to the head in the case that it finds a bone in the piece meat to be injected. Such elastic means are preferably formed, as it is best shown in the enlarged detail of FIG. 1 by small pistons 26 which may move sliding within cylindric chambers 27, aligned with the path of the needles 4, against the strength of a fluid, typically air, under pressure introduced in them through an inlet 28. Each of the said sliding pistons 26 offers on its bottom face, facing the top end of a corresponding needle 4, an offset 29 adapted for housing at the said end 18 distal from the end of the penetration point 14 thereof in the event of the needle 4 back motion. The length of each duct 3 is slightly longer than the maximum admissible back motion an injection needle 4 can sustain in the event of finding a bone in the meat piece to be injected.

The set of cylindric chambers 27 is mounted between two spaced plates 19, forming a supporting frame located above the said block 7, such structure being shaped as two frames 30a, 30b, which can be locked in an operating position and which may be tilted outwards the head (up to a position shown in dash lines in FIG. 1) to release the top ends of the duct 3 and allow the access and eventual replacement of the needles 4.

Thanks that there exists a given number of holes 15 distributed throughout the area of the needle which can penetrate in the meat product piece, the said means for supplying the fluid substance to be injected to the head of this invention are only activated when the head has been fully lowered, each needle 4 is located fully stuck in the meat piece and the injection starts. The fluid is supplied under a constant pressure over 5 $Kg/cm^2$, preferably about 8–12 $Kg/cm^2$ and such holes 15 located in the area immediately at the penetration point 14 of the needle 4 has a diameter of about 0.6 mm. This combination of pressure and size of the holes determine that the fluid, when going out, is sprayed while the needle is stuck in the meat product, being evenly distributed between the muscular fibres thereof.

Figure 5:
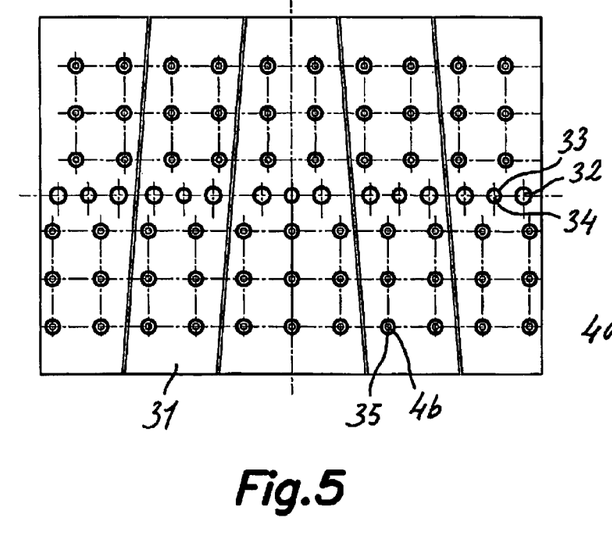
FIG. 5 is a plan view of the set of rammers of the head of this invention.

The head includes retractable rammers 31 which act pressing the meat product when the head is lowering and the needles 4 penetrate in the meat product and which act as extractors when the head is being lifted trapping the meat product pieces to assist in releasing the needles 4. Such rammers 31 are guided by means of upright bars 32 and linked to elastic means such as helical springs 33 (FIG. 3). The rammers are independent from each other as shown in FIG. 5 and each one is fastened to a pair of such guiding bars 32 and linked to one of the said helical springs 33 arranged around a rod 34 fixed on the rammer 31 between the bars 32. The bars 32 and bar 34 are guided and can slide along the head, protruding by the top end thereof when related rammer 31 finds an hindrance, that is to say, a meat product piece and it is retracted. Each rammer 31 includes holes 35 for let needles 4 passing through it, such holes 35 have a diameter wider than that of the needle 4 except at a lower end area 36 where the passing diameter is adjusted to the one of the needles 4. The thickness of the rammers 31 is such that the portion having a wider diameter of the holes 35 covers the whole area of the needle close to the penetration point 14 where are distributed the several injection holes 15, in a position prior to the injection.

According to a preferred example of embodiment of this invention, the injection needle has very accurate characteristics and sizes. Thus, it is preferred that the said area immediately close to the penetration point 14 of the needle 4 where such holes 15 are located extends along at least 100 mm and that the holes 15 are distributed following an helical path on the surface thereof. Preferably, the needle 4 comprises fourteen holes along the area immediately close to the penetration point 14. The said two passing holes 13 for the fluid access (FIG. 8) located diametrically opposite on the walls of the needle are located at a distance slightly longer than about 3/5 of the total length of the needle 4, which is over 2.5 times the length of the maximum back motion admissible for the needles 4. On its hand, the said total length of the needle 4 is comprised between 650 and 800 mm, depending on the drawing of the head, length of the displacement (up and down) and characteristics of the meat product or product to be injected.

What is claimed is:

1. A head having multiple retractable needles applicable for injecting in meat pieces fluid substances such as brine, proteins, phosphates or similar products in a solution, designed for an uprightly up and down run comprising:

a distributing chamber connected to means for supplying under pressure such fluid substance to be injected coming from a tank thereof;

a plurality of spaced injection needles (4) each of which having a penetration point (14), an internal axial passageway (12) communicated with at least an injection hole (15) close to the said penetration point (14), a length (4a) of the needle (4) extending through the said distribution chamber with possibility of guided slide and a end (18) distal from the penetration point (14) provided with an insertion limiting stop (17) which end (18) remains facing elastic retaining means which allow the needle back motion in the event it finds bone in the piece to be injected; and means for establishing a communication between such distribution chamber and said needle internal axial passageway (12);

characterized in that:

such distribution chamber comprises a plurality of elongated, parallel, intercommunicated ducts (3) through which the said lengths (4a) of the needles (4) can slide, such ducts (3) having a diameter wider than such lengths (4a) determining annular chambers and means (5) are arranged for sealing and guiding-centering such lengths (4a) close to the inlet and outlet of each duct (3);

such needles (4) comprise at least a hole (13) communicating with such axial passageway (12), such hole (13) being located in an area of such length (4a) at a distance of the said stop (17) equivalent to approximately the length of related duct (3) such hole (13) remaining positioned , which is at least one, in a lifted position of the head, prior to the injection, close to the lower end of related duct (3), so that it is always communicated within it during the guided displacement of the needle (4), allowing the access of such fluid to be injected within the said passageway (12) wherever the back motion level of the needle (4) could be; and in an area (4b) immediately close to the axial penetration point of each injection needle (4) there exists a plurality of holes (15) through which the injection is performed when the head is fully lowered and each needle is stuck in the meat product.

2. The head, according to claim 1, characterized in that the said distribution chamber is constituted by at least a prismatic block (7) provided with such plurality of upright, cylindric, through ducts (3) arranged substantially equidistant and distributed according to several parallel rows, the diameter of each duct (3) being slightly wider than that of the needles (4), defining around them an annular cavity for the fluid, the lengths (4a) of the needles (4) being able to slide through such ducts (3) and sockets (5) established within sleeves (9) threaded in the inlet and outlet mouths of each duct, constituting the said guided centered means, the ducts (3) of each row being communicated to each other by a cross passageway (10) linking by its ends distribution side ducts (11) leaning against each side of the block (7) communicated with such tank for supplying such fluid to be injected.

3. The head, according to claim 2, characterized in that the length of each duct (3) is slightly longer than the maximum back motion admissible an injection needle (4) can sustain in the event that it finds a bone in the meat piece to be injected.

4. The head, according to claim 2, characterized in that such cross passageway (10) for intercommunicating between each row of upright ducts (3) are situated close to a lower face of the block (7), closest to the injection area.

5. The head, according to claim 4, characterized in that the rows of ducts (3) are in addition cross communicated close to their top end, farthest from the injection area, with a distribution side duct (21) laterally associated to the block (7) and linking with a draining manifold (23).

6. The head, according to claim 4, characterized in that the said distribution side ducts (11) and draining duct (21) are fastened to the block (7) by stays (8) extending between two side faces of the block (7) and fixed by locking nuts (25) associated to its ends.

7. The head, according to claim 2, characterized in that the said side distribution ducts (11) communicate with ends of internal ducts (2) with side columns (1) linked to means for lifting-lowering the head.

8. The head, according to claim 2, characterized in that close to the sliding distal end (18) of such penetration point (14) of each needle (4) is arranged a bottom of a sliding piston (26) loaded by a fluid, which can move within a chamber (27) coaxial and superposed to each of the needles (4), such set of chambers (27) being mounted between two spaced plates (19) forming a framework located above the said block (7).

9. The head, according to claim 8, characterized in that each of the said sliding pistons (26), loaded with a fluid is provided with on its bottom face facing a top end of a related needle (4) an offset (29) adapted for housing such end thereof, in the event of the needle (4) back motion.

10. The head, according to claim 8, characterized in that the framework supporting the set of chambers (27) bearing the pistons (26) constituting the retaining elastic means of the needles (4) are shaped as two frames (30a, 30b) which can be locked in an operating position and which can tilt outwards the head to release the top ends of the ducts (3) and allow the access and eventual replacement of the needles (4).

11. The head, according to claim 1, characterized in that said means for supplying the fluid substance to be injected are provided under constant pressure, and the said holes (15) immediately close to the penetration point (14) of the needles (4) have a diameter of about 0.6 mm, such pressure having such a value that it produces a spraying injection when each needle (4) is fully stuck in the meat product, the head is completely lowered and the injection starts.

12. The head, according to claim 11, characterized in that the fluid substance to be injected is supplied under a constant pressure of about 6–12 Kg/cm$^2$.

13. The head, according to claim 12, characterized in that such head is associated to:
means to make such meat pieces go forwards under such head with intermittent stops along a path;
lowering means for moving such head, such needles (4) penetrating in the said meat product, at such stop and lifting steps to take them apart from the later;
retractable rammers (31) acting by pressing the meat piece and linked to elastic means (33), with passing holes (35) for passing through the said needles (4);
means for supplying such pressurized fluid substance within the needles (4) when they are fully inserted in the meat product and the head reaches the limit of its lower run.

14. The head, according to claim 13, characterized in that such passing holes (35) of such rammers (31) have a diameter wider than that of the needle (4) except at a lower end area (36), of adjusted passage thereof and in that the area having a wider diameter (35) covers the whole of the needle (4) provided with several holes (15) in a position prior to the injection.

15. An injection needle for injecting meat product, designed to be mounted on a head having multiple needles operating according to an upright lowering-lifting run which integrates a distribution chamber connected to means for supplying under pressure such fluid substance to be injected coming from a tank thereof, such distribution chamber comprises a plurality of cylindric, parallel, intercommunicated ducts (3) each of which receives, with possibility of sliding, a related needle (4), a penetration point (14) of the needle (4) protruding at the lower end of the ducts (3) and an end (18) distal from such point (14) at the top end thereof, such distal end (18) which includes a stop (17) for limiting the insertion against elastic retaining means (26,27) externally to the ducts (3) to allow the needle (4) back motion in the event that it finds a bone in the piece to be injected, such needle being characterized in that it comprises:
an internal axial passageway (12) communicated with several injection holes (15) having a small section, distributed along an area (4b) close to such penetration point (14) and a length (4a) which can remain arranged guided through a related duct (3) with possibility of sliding; and
at least a through hole (13) communicating with such axial passageway (12) such hole (13) being located in an area of the said length (4a) at a distance of the said stop (17) equivalent to approximately the length of related duct (3), such through hole (13) which is at least one remaining positioned in a lifting position of the head, to the injection, close to the lower end of related duct (3) so that because of its distance from the stop (17) the hole (13) will be always communicated within the duct (3) during the guided travel of the needle (4) allowing the access of such fluid to be injected within such passageway (12) regardless of the level of back motion of the needle (4).

16. The injection needle, according to claim 15, characterized in that such area (4b) immediately close to the penetration point (14) of the needle (4), where such injection holes (15) are located extends along at least 80 mm and the holes (15) are distributed following an helical travel on the surface thereof.

17. The injection needle, according to claim 16, characterized in that it comprises a plurality of holes (15) along the said area (4b) immediately close to the penetration point (14) of the needle (4).

18. The injection needle, according to claim 15, characterized in that it comprises two of such through holes (13) for the access of the fluid to the internal passageway (12) in points opposed to the cylindric wall of the needle and located at a distance of the penetration point (14) slightly over ⅗ the total length of the needle (4).

19. The injection needle, according to claim 15, characterized in that the passing section of such through hole (13) which is at least one, is wider than the section of the internal axial passageway (12) of the needle (4).

20. The injection needle, according to claim 15, characterized in that its total length is 2.5 times longer than the maximum back motion admissible for the needles (4).

21. The injection needle according to claim 20, characterized in that its length is comprised between 650 and 800 mm, depending on the product to be injected, the design of the head and the length of its displacement in said upright lifting-lowering run.

* * * * *

UNITED STATES PATENT AND TRADEMARK OFFICE
CERTIFICATE OF CORRECTION

PATENT NO. : 6,901,850 B2
DATED : June 7, 2005
INVENTOR(S) : Narcis Lagares Corominas It is certified that error appears in the above-identified patent and that said Letters Patent is hereby corrected as shown below:

<u>Column 8,</u>
Line 33, after the word "head" and before the word "to" insert the word -- prior --.

Signed and Sealed this

Thirtieth Day of August, 2005

JON W. DUDAS
*Director of the United States Patent and Trademark Office*